US009448583B1

United States Patent
Lee et al.

(10) Patent No.: US 9,448,583 B1
(45) Date of Patent: Sep. 20, 2016

(54) ELECTRONIC DEVICE AND HINGE ASSEMBLY

(71) Applicant: DATAVAN INTERNATIONAL CORP., New Taipei (TW)

(72) Inventors: Chun-Yi Lee, New Taipei (TW); Yu-Chen Chang, New Taipei (TW)

(73) Assignee: DATAVAN INTERNATIONAL CORP., New Taipei (TW)

( * ) Notice: Subject to any disclaimer, the term of this patent is extended or adjusted under 35 U.S.C. 154(b) by 0 days.

(21) Appl. No.: 14/676,420

(22) Filed: Apr. 1, 2015

(51) Int. Cl.
| | |
|---|---|
| *G06F 1/16* | (2006.01) |
| *E05D 3/12* | (2006.01) |
| *E05D 11/00* | (2006.01) |
| *E05D 11/08* | (2006.01) |
| *E05F 5/02* | (2006.01) |

(52) U.S. Cl.
CPC . *G06F 1/16* (2013.01); *E05D 3/12* (2013.01); *E05D 11/0054* (2013.01); *E05D 11/082* (2013.01); *E05F 5/02* (2013.01)

(58) Field of Classification Search
CPC .............. G06F 1/16; E05D 3/12; E05D 5/02
USPC .......................... 361/679.21, 679.27, 679.26
See application file for complete search history.

(56) References Cited

U.S. PATENT DOCUMENTS

| | | | | | |
|---|---|---|---|---|---|
| 4,960,256 | A | * | 10/1990 | Chihara et al. ........ | G06F 1/1616 16/361 |
| 6,561,333 | B2 | * | 5/2003 | Larson et al. .......... | F16D 7/022 192/33 C |
| 7,636,984 | B2 | * | 12/2009 | Oh ........................ | G06F 1/1686 16/297 |
| 2009/0320243 | A1 | * | 12/2009 | Wang et al. .......... | G06F 1/1616 16/303 |

\* cited by examiner

*Primary Examiner* — Dion R Ferguson
*Assistant Examiner* — Mandeep S Buttar
(74) *Attorney, Agent, or Firm* — Muncy, Geissler, Olds & Lowe, P.C.

(57) ABSTRACT

An electronic device and hinge assembly includes an electronic device body including a base and a main unit, and hinge devices pivotally connecting the base and the main unit for allowing adjustment of the angular position of the main unit relative to the base step by step in a series of angles. Each hinge device includes a casing affixed to one of the base and the main unit, a pivot shaft connected to the base and the main unit and rotatably inserted through the casing and secured by a retaining ring, and a friction wheel set and a damper mounted on the pivot shaft. The friction wheel set includes a first friction wheel and having recessed portions equiangularly spaced at one side thereof, and a second friction wheel rotatable with the pivot shaft relative to the first friction wheel and having raised portions respectively engageable into the recessed portions.

8 Claims, 6 Drawing Sheets

ELECTRONIC DEVICE AND HINGE ASSEMBLY

BACKGROUND OF THE INVENTION

1. Field of the Invention

The present invention relates to hinge technology, and more particularly to an electronic device and hinge assembly, which includes an electronic device body including a base and a main unit, and hinge devices to pivotally connect the base and main unit of the electronic device body, wherein each hinge device consists of a pivot shaft, a friction wheel set and a damper for allowing adjustment of the angular position of the main unit relative to the base smoothly and stably through a series of angles.

2. Description of the Related Art

Following fast development of electronic technology, advanced electronic apparatus having the characteristics of strong operational capabilities, high operating speed and small size have been continuously created. With the popularity of computers and networks, most general family or company will use computers and the Internet. Even in the shops, restaurants and other places, we can see the use of computers and the Internet. Further, the retailing industry is moving toward the chain system. Many retail operators adopt point of sales management system (POS), electronic ordering system (EOS) or computer assisted ordering system for registering and calculating transactions, scanning barcodes, drawing up invoices or receipts, ordering, providing the latest news, analyzing and handling product information, membership information and sales data, saving a large amount of manpower and operating costs.

Further, various different designs of hinge devices are known and widely used in electronic devices to pivotally connect a display device, face panel or outer cover to a mainframe or base, allowing adjustment of the angular position of the display device, face panel or outer cover relative to the mainframe or base. However, a user may apply excessive force to turn the display device, face panel or outer cover relative to the mainframe or base over the limited range of angles, leading to internal flexible circuit board or bus line damage. Further, if the user closes the display device face panel or outer cover on the mainframe or base in a rush, the display device face panel or outer cover can be crushed. There are improved designs of hinge devices capable of providing high torque, however, these improved designs of hinge devices commonly have a complicated structure, and their fabrication requires high precision. Thus, these improved designs of hinge devices are not suitable for mass fabrication, and their manufacturing cost is inevitably high.

SUMMARY OF THE INVENTION

The present invention has been accomplished under the circumstances in view. It is therefore the main object of the present invention to provide an electronic device and hinge assembly, which comprises an electronic device body comprising a base and a main unit, and hinge devices pivotally connecting the base and the main unit for allowing adjustment of the angular position of the main unit relative to the base step by step through a series of angles. Each hinge device comprises a casing affixed to one of the base and main unit of the electronic device body, a pivot shaft connected to the other of the base and main unit of the electronic device body and rotatably inserted through the casing and secured thereto by a retaining ring, and a friction wheel set and a damper mounted on the pivot shaft in the casing and abutted against each other. The friction wheel set comprises a first friction wheel affixed to the casing and having recessed portions equiangularly spaced at one side thereof, and a second friction wheel rotatable with the pivot shaft relative to the first friction wheel and having raised portions respectively engageable into the recessed portions of the first friction wheel. Subject to the functioning of the friction wheel set and the damper, the main unit can be biased relative to the base smoothly and stably and positively positioned in the desired angular position.

Further, when biasing the main unit relative to the base, the second friction wheel is rotated relative to the first friction wheel, and each raised portion of the second friction wheel is shifted from one recessed portion of the associating first friction wheel to another. After each raised portion moved away from one recessed portion and reached to a respective next recessed portion, elastic members of the damper release an elastic potential energy to hold down the raised portions of the second friction wheel in the respective recessed portions of the first friction wheel. Thus, the hinge devices allow adjustment of the angular position of the main unit relative to the base step by step through a series of angles. Further, the first and second friction wheels and the elastic members of the damper are easy and inexpensive to manufacture.

Preferably, the pivot shaft of each hinge device further comprises an outer thread extending around the periphery of the shaft body thereof; each hinge device further comprises a locking member threaded onto the outer thread of the shaft body and stopped at the damper against the friction wheel set. Further, by means of adjusting the fastening tightness of the locking member on the outer thread of the pivot shaft, the elastic potential energy of the elastic members of the damper is relatively adjusted, and thus, the torque produced by the damper during rotation of the pivot shaft is relatively adjusted to buffer the biasing speed of main unit during its angular adjustment by the user. Thus, the invention enhances angular adjustment smoothness and stability.

Preferably, the casing of each hinge further comprises an insertion slot radially cut through the periphery thereof in communication with the accommodation chamber and disposed adjacent to the opening, a position-limit groove located in one end thereof in communication with the opening, and two stop edges located at two opposite sides of the position-limit groove. Further, the pivot shaft of each hinge device further comprises a stop block connected between the mating connection portion and shaft body thereof and biasable with the respective pivot shaft in the position-limit groove of the casing and stoppable at one of the two stop blocks of the casing to limit the range of rotation of the pivot shaft. Further, the first friction wheel of the friction wheel set of each hinge device comprises an engagement lug extended from the periphery thereof and engaged into the insertion slot of the casing.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
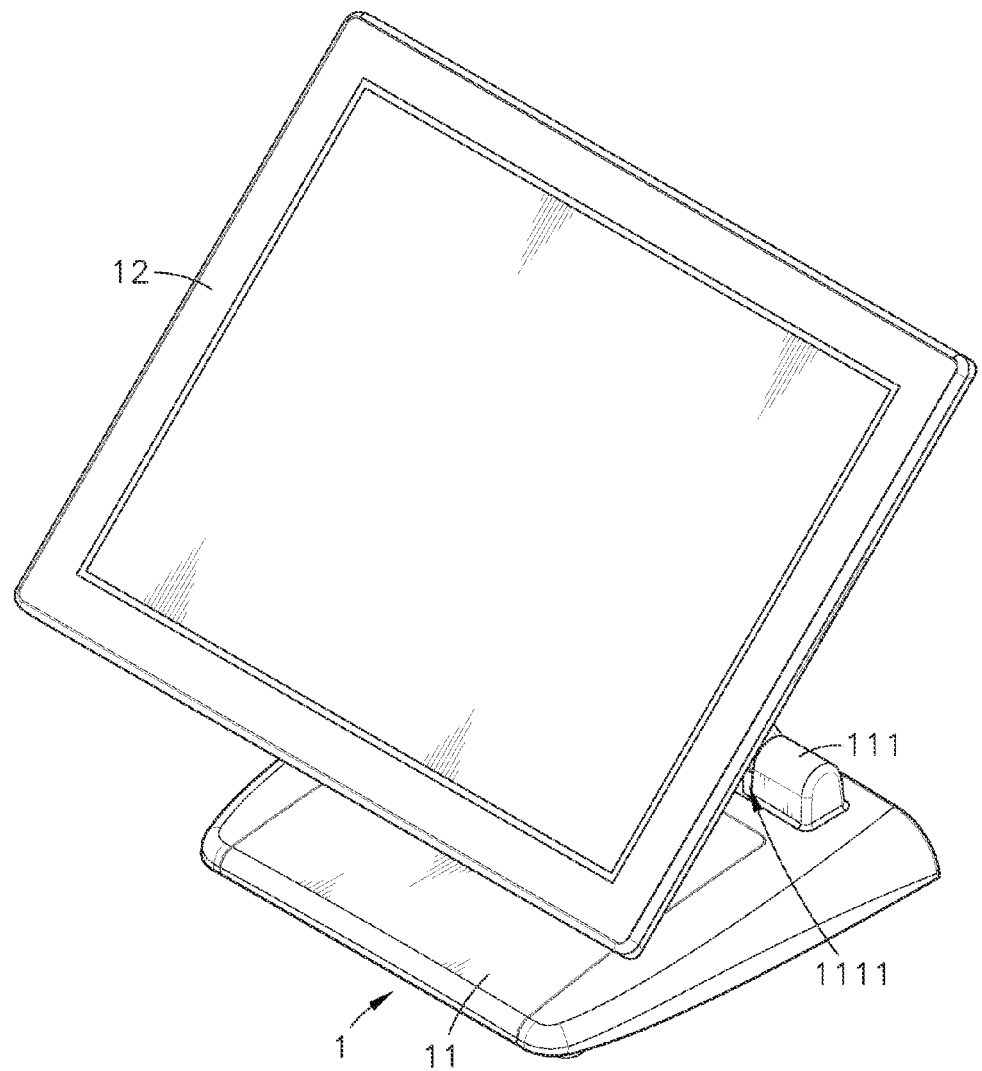
FIG. 1 is an oblique top elevational view of an electronic device and hinge assembly in accordance with the present invention.
Figure 2:
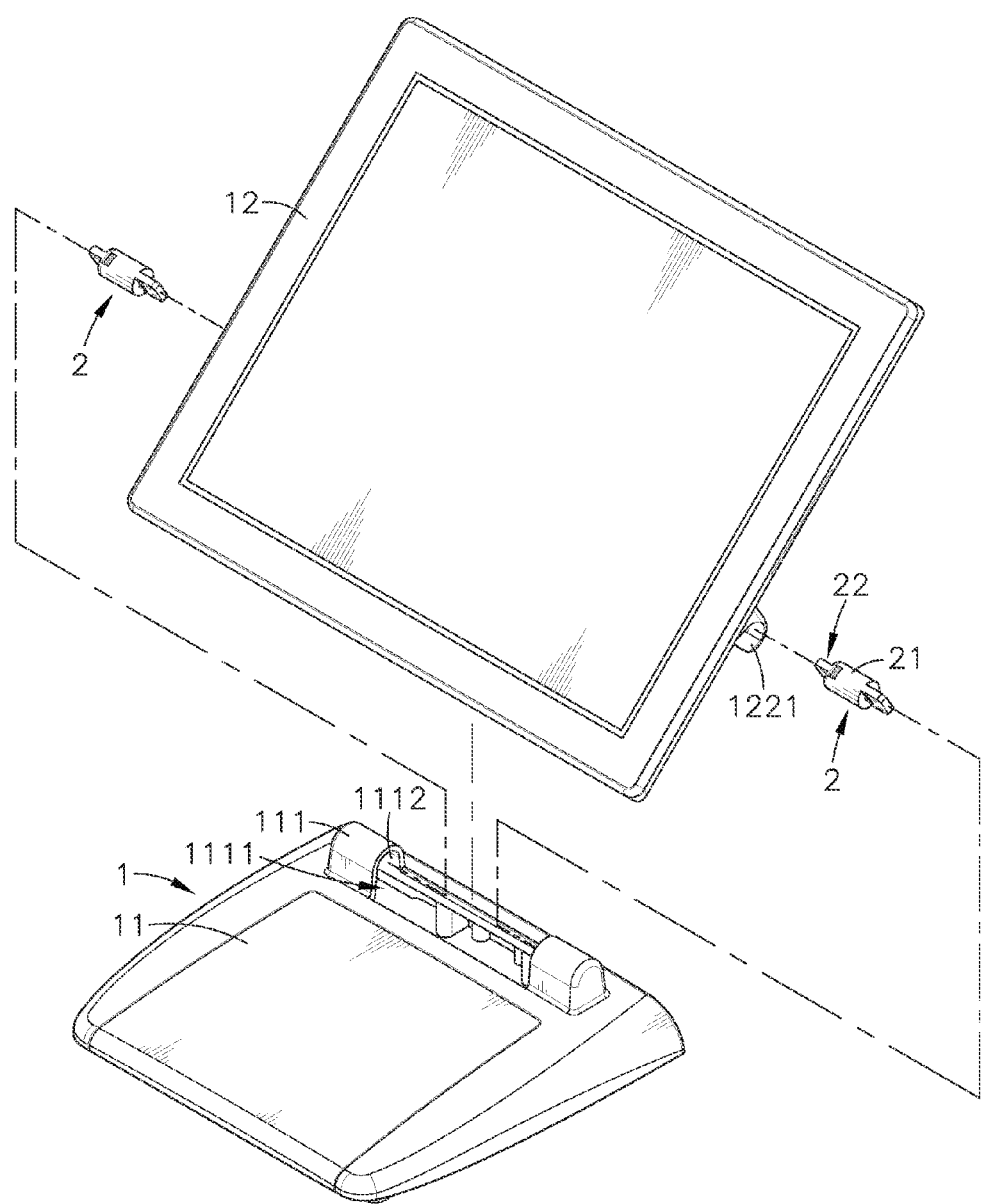
FIG. 2 is an exploded view of the electronic device and hinge assembly in accordance with the present invention.
Figure 3:
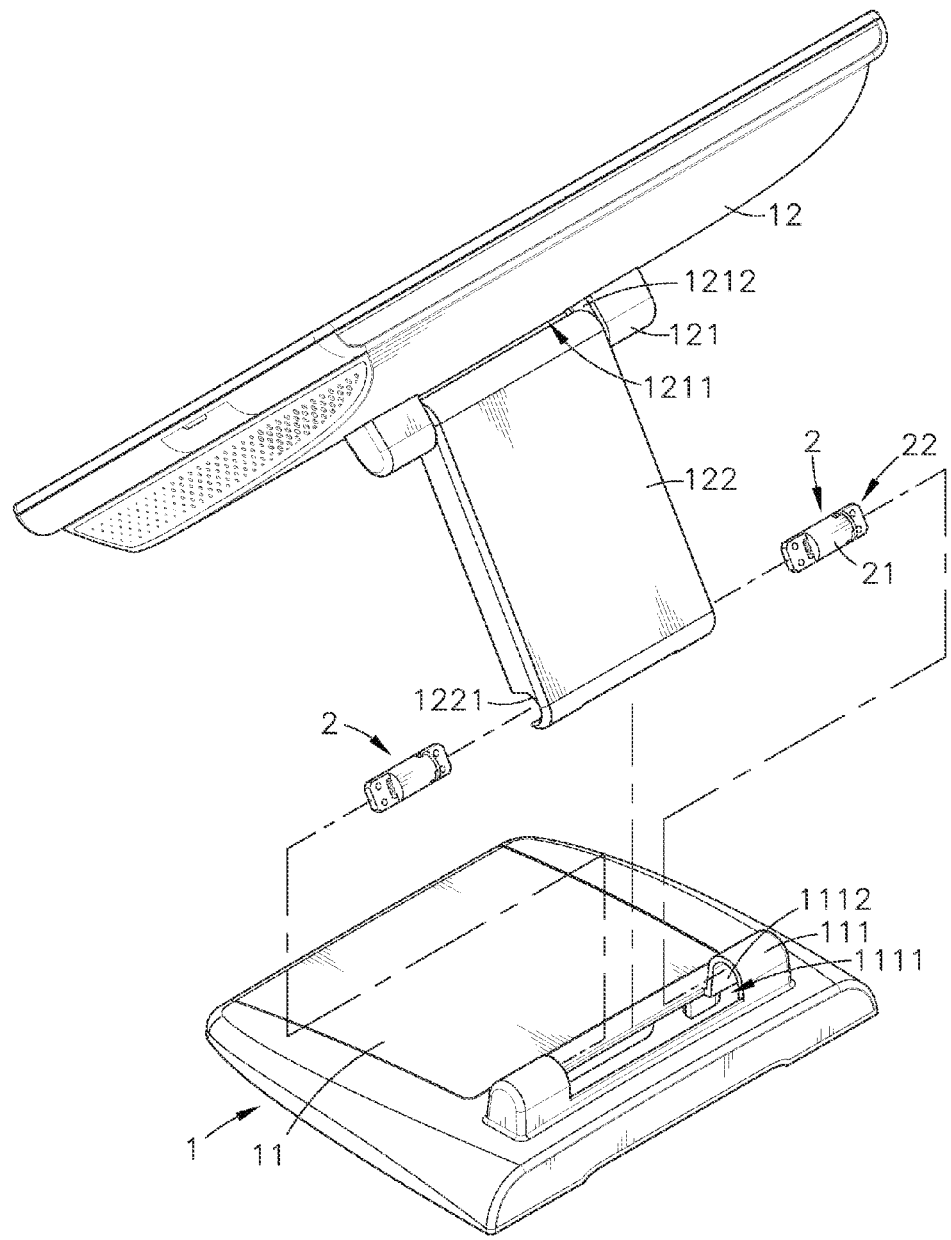
FIG. 3 corresponds to FIG. 2 when viewed from another angle.
Figure 4:
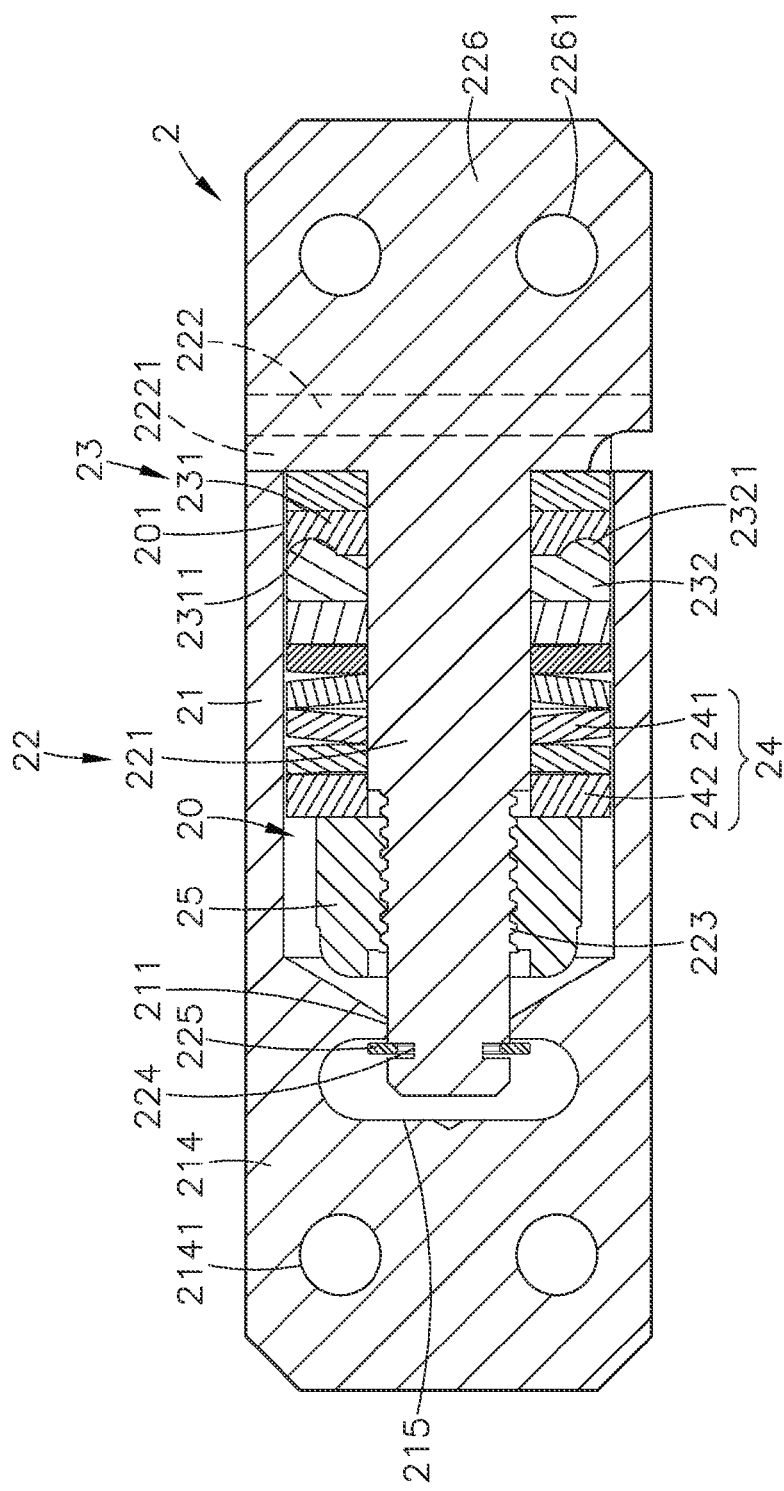
FIG. 4 is a sectional side view of the hinge of the electronic device and hinge assembly in accordance with the present invention.
Figure 5:
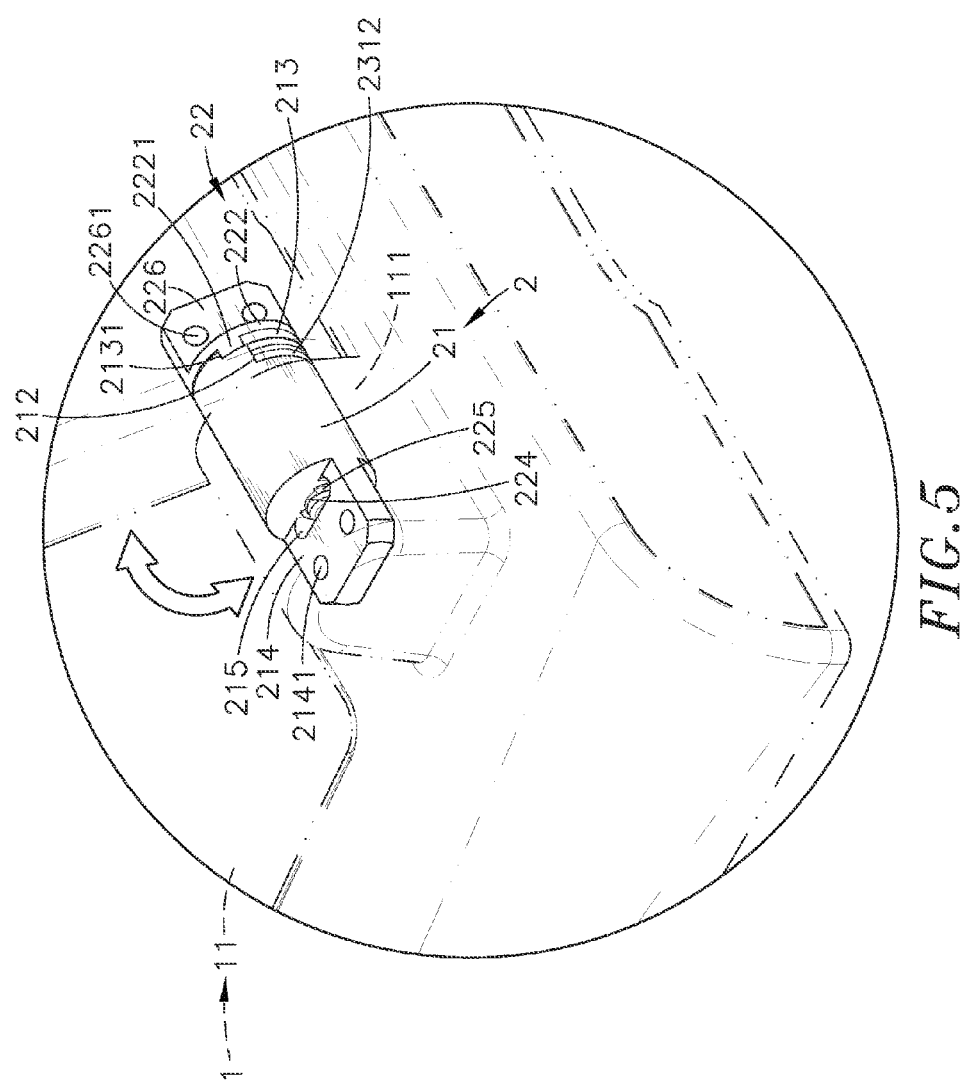
FIG. 5 is a schematic enlarged view of a part of the electronic device and hinge assembly in accordance with the present invention.
Figure 6:
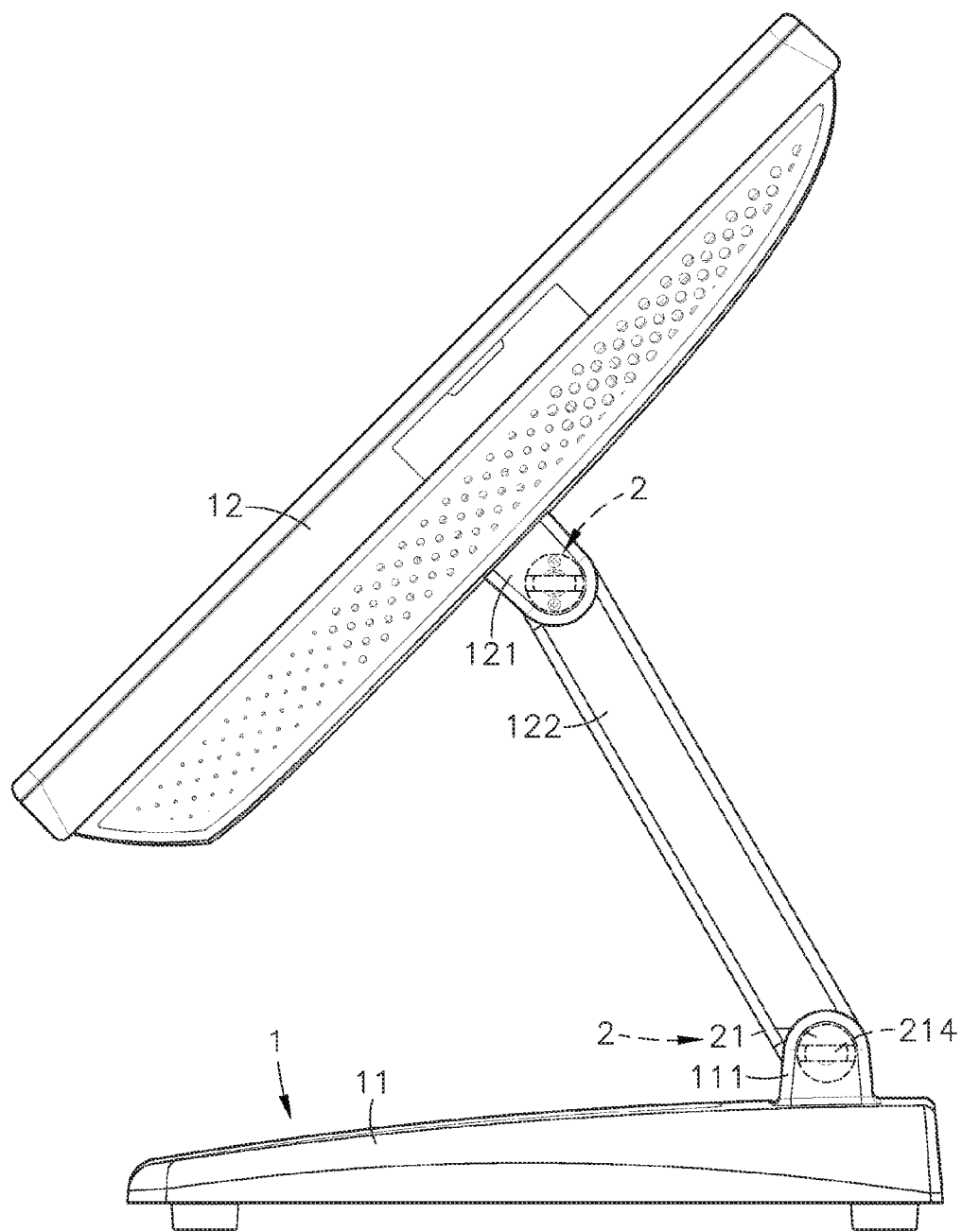
FIG. 6 is a side view of the present invention, illustrating the angular position of the electronic device and hinge assembly adjusted.

Referring to FIGS. 1-6, an oblique top elevational view of an electronic device and hinge assembly in accordance with the present invention, an exploded view of the electronic device and hinge assembly, another exploded view of the electronic device and hinge assembly, a sectional side view of the hinge of the electronic device and hinge assembly, a schematic enlarged view of a part of the electronic device and hinge assembly and an adjusted side view of the electronic device and hinge assembly are shown. The electronic device and hinge assembly comprises an electronic device body 1, and a plurality of hinge devices 2.

The electronic device body 1 comprises a base 11, a main unit 12, and a support arm 122 pivotally coupled between the base 11 and the main unit 12 by the hinge devices 2. The base 11 comprises a first pivot-connection block 111 raised from a top wall thereof. The first pivot-connection block 111 comprises a first shaft groove 1111 extending along the length thereof on the middle, and two mounting holes 1112 defined in two opposite ends thereof and respectively disposed in communication with two opposite ends of the first shaft groove 1111. The main unit 12 comprises a second pivot-connection block 121 raised from a back wall thereof. The second pivot-connection block 121 comprises a second shaft groove 1211 extending along the length thereof on the middle, and two positioning holes 1212 defined in two opposite ends thereof and respectively disposed in communication with two opposite ends of the second shaft groove 1211. The support arm 122 comprises a mounting groove 1221 transversely located in each of opposing top and bottom ends thereof.

Further, the electronic device body 1 can be an all-in-one computer, i.e., the base 11 and the main unit 12 can be respectively the base and touch panel (LCD monitor) of the all-in-one computer. Further, the all-in-one computer has built in the touch panel (LCD monitor) thereof a motherboard with related electronic component parts (such as processor, memory, display card, connectors, etc.), hard disk drive, CD-ROM, power supply device, cooling fan, etc. Alternatively, the base 11 can be made in the form of a computer mainframe, and the main unit 12 can be a LCD monitor mating with the base 11. In actual application, the electronic device body 1 can be configured as a point of sales (POS) system, electronic ordering system (EOS), computer assisted ordering (CAO) system, notebook computer, printer, or any other flip-up or swivel electronic device.

Each hinge device 2 comprises a cylindrical casing 21, a pivot shaft 22, a friction wheel set 23, a damper 24, and a locking member 25. The cylindrical casing 21 comprises an accommodation chamber 20 axially defined therein, an opening 201 defined in one end thereof in communication with the accommodation chamber 20, an axle hole 211 axially extending through the two opposite ends thereof in a bottom side relative to the accommodation chamber 20, an insertion slot 212 radially cut through the peripheral wall thereof near the opening 201 and disposed in communication with the accommodation chamber 20, a position-limit groove 213 abutted to the opening 201, two stop edges 2131 located at two opposite sides of the position-limit groove 213, a first mounting plate 214 extended from the opposite end thereof remote from the opening 201, a plurality of mounting through holes 2141 located in the first mounting plate 214, and a locating slot 215 located in the first mounting plate 214 in communication with the axle hole 211.

The pivot shaft 22 comprises a shaft body 221 inserted through the axle hole 211 of the casing 21, an expanded mating connection portion 222 located at one end of the shaft body 221 and disposed outside the opening 201 of the casing 21, a stop block 2221 connected between the mating connection portion 222 and the shaft body 221 and movable with the shaft body 221 in the position-limit groove 213 to selectively stop against one of the two stop edges 2131 of the casing 21, an outer thread 223 spirally extending around the periphery of the shaft body 221 within the accommodation chamber 20, a cut plane (not shown) located on the periphery of the shaft body 221 and abutted to one end of the outer thread 223 within the accommodation chamber 20, a retaining groove 224 extending around the periphery of the shaft body 221 and disposed outside the axle hole 211 and suspending in the locating slot 215, a retaining ring 225 fastened to the retaining groove 224 and stopped at a part of the casing 21 outside the axle hole 211 to prohibit the shaft body 221 from falling out of the casing 21, a second mounting plate 226 outwardly extended from the mating connection portion 222 opposite to the stop block 2221, and a plurality of mounting through holes 2261 located in the second mounting plate 226.

The friction wheel set 23 and the damper 24 are mounted around the shaft body 221 of the pivot shaft 22 and positioned between the outer thread 223 and the casing 21. The friction wheel set 23 comprises a first friction wheel 231 and a second friction wheel 232. The first friction wheel 231 comprises a plurality of recessed portions 2311 equiangularly spaced at one side thereof. The second friction wheel 232 comprises a plurality of raised portions 2321 equiangularly spaced at one side thereof and respectively facing toward the recessed portions 2311. The first friction wheel 231 further comprises an engagement lug 2312 extended from the outer perimeter thereof and engaged into the insertion slot 212 to stop the first friction wheel 231 from rotation relative to the casing 21. The damper 24 comprises a plurality of elastic members 241 such as compression springs, spring leaves or torsion springs, and two washers 242 stopped at two opposite sides of the elastic members 241. One washer 242 of the damper 24 is abutted against the second friction wheel 232. The second friction wheel 232 and the washers 242 each define therein a non-circular center mounting hole (not shown) set into engagement with the cut plane at the periphery of the shaft body 221. Thus, rotating the pivot shaft 22 through an angle can carry the second friction wheel 232 of the friction wheel set 23 and the washers 242 of the damper 24 to rotate synchronously. Further, the locking member 25 (for example, lock nut) is threaded onto the outer thread 223 of the pivot shaft 22 and stopped against the other washer 242 of the damper 24.

When assembling the electronic device and hinge assembly, connect two hinge devices 2 between the two opposite ends of the mounting groove 1221 at the bottom end of the support arm 122 and the two mounting holes 1112 in the two opposite ends of the first shaft groove 1111 of the first pivot-connection block 111 at the base 11 of the electronic device body 1 by: inserting the casing 21 and first mounting plate 214 of each respective hinge device 2 into one respective mounting hole 1112 in the first shaft groove 1111 and fixedly fastening the mounting through hole 2141 of the first mounting plate 214 of each respective hinge device 2 to the first pivot-connection block 111 with fastening elements (such as screws or rivets) and then inserting the second mounting plate 226 with the mating connection portion 222 of the pivot shaft 22 of each respective hinge device 2 into the mounting groove 1221 at the bottom end of the support arm 122 and fixedly fastening the mounting through hole 2261 of the second mounting plate 226 of each respective hinge device 2 to the support arm 122 with fastening elements (such as screws or rivets). Thereafter, connect the other two hinge devices 2 between the two opposite ends of the mounting groove 1221 at the top end of the support arm 122 and the two positioning holes 1212 in the two opposite ends of the second shaft groove 1211 of the second pivot-connection block 121 at the main unit 12 of the electronic device body 1 by: inserting the casing 21 and first mounting plate 214 of each respective hinge device 2 into one respective positioning hole 1212 in the second shaft groove 1211 and fixedly fastening the mounting through hole 2141 of the first mounting plate 214 of each respective hinge device 2 to the second pivot-connection block 121 with fastening elements (such as screws or rivets) and then inserting the second mounting plate 226 with the mating connection portion 222 of the pivot shaft 22 of each respective hinge device 2 into the mounting groove 1221 at the top end of the support arm 122 and fixedly fastening the mounting through hole 2261 of the second mounting plate 226 of each respective hinge device 2 to the support arm 122 with fastening elements (such as screws or rivets).

Further, the casing 21 of each hinge device 2 and each mounting hole 1112 in the first pivot-connection block 111 and each positioning hole 1212 in the second pivot-connection block 121 can be configured having a non-circular cross section, such as rectangular, elliptical, rhombic or polygonal cross section. After fitting of the casings 21 of the hinge devices 2 into the respective mounting holes 1112 and positioning holes 1212 in the first and second pivot-connection block 111,121, the casings 21 of the hinge devices 2 are prohibited from rotation relative to the base 11 or main unit 12 of the electronic device body 1. Further, as an alternate form of the present invention, the support arm 122 can be eliminated from the electronic device body 1, and two hinge devices 2 can be used to pivotally connect the second pivot-connection block 121 of the main unit 12 to the first pivot-connection block 111 of the base 11.

If the user wishes to adjust the angular position of the main unit 12 relative to the base 11, the user can bias the main unit 12 of the electronic device body 1 through a desired angle, causing the shaft body 221 of the pivot shaft 22 of each associated hinge device 2 to be rotated by the second pivot-connection block 121 of the main unit 12 or the support arm 122 in the axle hole 211 of the respective associating casing 21 in the same angle, at the same time, each raised portion 2321 of the second friction wheel 232 of the friction wheel set 23 of each associating hinge device 2 is shifted from one recessed portion 2311 of the respective associating first friction wheel 231 to another. After each raised portion 2321 is moved away from one recessed portion 2311 before reaching to another recessed portion 2311, the second friction wheel 232 imparts an axial pressure to the adjacent washer 242 of the damper 24 against the respective associating elastic members 241, and thus, each respective pivot shaft 22 produces no torque during its rotation at this time. After each raised portion 2321 moved away from one recessed portion 2311 and reached to a respective next recessed portion 2311, the respective elastic members 241 release their elastic potential energy to hold down the raised portions 2321 of the respective second friction wheels 232 of the respective hinge devices 2 in the respective recessed portions 2311 of the respective first friction wheels 231, and thus, the main unit 12 is held in the desired angle, at the same time, the elastic members 241 of the respective dampers 24 are respectively abutted against the respective washers 242, providing a damping effect. Further, by means of adjusting the fastening tightness of the locking member 25 on the outer thread 223 of the associating pivot shaft 22, the elastic potential energy of the associating elastic members 241 is relatively adjusted, and thus, the torque produced by the respective damper 24 during rotation of the respective pivot shaft 22 is relatively adjusted to buffer the biasing speed of main unit 12 during its angular adjustment by the user. Thus, the invention enhances angular adjustment smoothness and stability.

During rotation of the pivot shaft 22 of each hinge device 2, the raised portions 2321 of the second friction wheel 232 of the friction wheel set 23 of each hinge device 2 are shifted relative to the recessed portions 2311 of the respective associating first friction wheel 231, and the elastic potential energy of the elastic members 241 of the damper 24 of each hinge device 2 can positively hold down the raised portions 2321 of the second friction wheel 232 of the friction wheel set 23 of each hinge device 2 in the respective recessed portions 2311 of the respective associating first friction wheel 231. Thus, the invention allows adjustment of the main unit 12 of the electronic device body 1 relative to the base 11 or support arm 122 step by step through a series of angles. Further, the first friction wheel 231 and second friction wheel 232 of the friction wheel set 23 are easy to fabricate. Further, the elastic members 241 of the damper 24 are commercially available components convenient for mass production at a low cost.

Further, when adjusting the angular position of the main unit 12 of the electronic device body 1 to bias the pivot shaft 22 of each respective hinge device 2 in the respective axle hole 211 of the respective casing 21, the respective stop block 2221 is moved in the respective position-limit groove 213 and stoppable at one of the two stop edges 2131 at the two opposite sides of the position-limit groove 213, and thus, the biasing angle of the main unit 12 relative to the base 11 is controlled within a predetermined range, avoiding main unit damage due to overbiasing.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electronic device and hinge assembly, comprising an electronic device body, said electronic device body comprising a base and a main unit, and a plurality of hinge devices pivotally connected between said base and said main unit for allowing adjustment of the angular position of said main unit relative to said base, wherein each said hinge device comprises a casing selectively affixed to one of said main unit and said base, said casing comprising an accommodation chamber therein, an opening in one of two opposite ends thereof in communication with said accommodation chamber and an axle hole axially extending the two opposite ends thereof in a bottom side of said accommodation chamber, a pivot shaft, said pivot shaft comprising a shaft body inserted through said axle hole, a mating connection portion located at one end of said shaft body and disposed outside said opening and a retaining groove extending around the periphery of an opposite end of said shaft body outside said axle hole, a retaining ring fastened to said retaining groove and stopped outside said casing, a friction wheel set mounted on said shaft body in said accommodation chamber, and a damper mounted on said shaft body and abutted against said friction wheel set, said friction wheel set comprising a first friction wheel mounted around said shaft body and fixedly connected to said casing and a second friction wheel mounted on said shaft body and rotatable with said shaft body relative to said first friction wheel, said first friction wheel comprising a plurality of recessed portions equiangularly spaced at one side thereof, said second friction wheel comprising a plurality of raised portions equiangularly spaced at one side thereof and respectively facing toward and engageable into said recessed portions of said first friction wheel.

2. The electronic device and hinge assembly as claimed in claim 1, wherein said base of said electronic device body comprises a first pivot-connection block raised from a top wall thereof; each said hinge device further comprises a first mounting plate extended from the casing thereof and affixed to said first pivot-connection block of said base, and a locating slot located in said first mounting plate in communication with the associating said axle hole for accommodating the associating said retaining ring.

3. The electronic device and hinge assembly as claimed in claim 2, wherein said first pivot-connection block of said base comprises a first shaft groove, and two mounting holes located at two opposite ends of said first shaft groove; the first mounting plates of two said hinge devices are respectively fixedly fastened to said two mounting holes.

4. The electronic device and hinge assembly as claimed in claim 1, wherein said electronic device body further comprises a second pivot-connection block located at a back wall of said main unit, and a support arm connected between said second pivot-connection block and said base, said support arm comprising a mounting groove located in a bottom end thereof; each said hinge device further comprises a second mounting plate extended from the mating connection portion of the respective said pivot shaft, the second mounting plates of two said hinge devices being respectively affixed to two opposite ends of said mounting groove in the bottom end of said support arm.

5. The electronic device and hinge assembly as claimed in claim 4, wherein said support arm further comprises a second shaft groove located in an opposing top end thereof and pivotally connected to said second pivot-connection block at said main unit by two said hinge devices.

6. The electronic device and hinge assembly as claimed in claim 1, wherein said casing of each said hinge device further comprises an insertion slot radially cut through the periphery thereof in communication with said accommodation chamber and disposed adjacent to said opening, a position-limit groove located in one end thereof in communication with said opening, and two stop edges located at two opposite sides of said position-limit groove; said pivot shaft of each said hinge device further comprises a stop block connected between the mating connection portion and shaft body thereof and biasable with the respective said pivot shaft in the position-limit groove of the associating said casing and stoppable at one of the two stop blocks of the associating said casing; said first friction wheel of said friction wheel set of each said hinge device comprises an engagement lug extended from the periphery thereof and engaged into said insertion slot of the associating said casing.

7. The electronic device and hinge assembly as claimed in claim 1, wherein said pivot shaft of each said hinge device further comprises an outer thread extending around the periphery of the shaft body thereof; each said hinge device further comprises a locking member threaded onto said outer thread of the associating said shaft body and stopped at the associating said damper against the associating said friction wheel set.

8. The electronic device and hinge assembly as claimed in claim 7, wherein said damper of each said hinge device comprises two washers mounted on said shaft body of the associating said pivot shaft, and a plurality of elastic members mounted on said shaft body of the associating said pivot shaft and stopped between said two washers, one said washer being abutted against said second friction wheel of the associating said friction wheel set, the other said washer being abutted against the associating said locking member.

* * * * *